US009526988B2

(12) United States Patent
Tardif et al.

(10) Patent No.: US 9,526,988 B2
(45) Date of Patent: Dec. 27, 2016

(54) GAME FOR PORTABLE DEVICES OR OTHER GAMING DEVICES

(71) Applicant: Escalation Studios, Inc., Dallas, TX (US)

(72) Inventors: Marc A. Tardif, Dallas, TX (US); Thomas W. Mustaine, Dallas, TX (US)

(73) Assignee: Escalation Studios, Inc., Dallas, TX (US)

( * ) Notice: Subject to any disclaimer, the term of this patent is extended or adjusted under 35 U.S.C. 154(b) by 224 days.

(21) Appl. No.: 13/918,498

(22) Filed: Jun. 14, 2013

(65) Prior Publication Data

US 2013/0337913 A1   Dec. 19, 2013

Related U.S. Application Data

(60) Provisional application No. 61/659,775, filed on Jun. 14, 2012.

(51) Int. Cl.
*A63F 9/00* (2006.01)
*A63F 13/46* (2014.01)
*G07F 17/32* (2006.01)
*A63F 13/00* (2014.01)
*A63F 13/2145* (2014.01)
*A63F 13/213* (2014.01)

(52) U.S. Cl.
CPC .............. *A63F 13/46* (2014.09); *A63F 13/005* (2013.01); *G07F 17/3211* (2013.01); *A63F 13/213* (2014.09); *A63F 13/2145* (2014.09); *A63F 2300/1093* (2013.01); *A63F 2300/69* (2013.01); *A63F 2300/8064* (2013.01)

(58) Field of Classification Search
None
See application file for complete search history.

(56) References Cited

U.S. PATENT DOCUMENTS

| | | | | |
|---|---|---|---|---|
| 4,955,614 | A * | 9/1990 | Buda | 273/240 |
| 5,921,864 | A * | 7/1999 | Walker | A63F 3/0421 273/272 |
| 6,102,796 | A * | 8/2000 | Pajitnov et al. | 463/9 |
| 6,279,911 | B1 * | 8/2001 | Cherry | 273/299 |
| 6,435,511 | B1 * | 8/2002 | Vancura | G06Q 30/02 273/274 |
| 6,935,945 | B2 * | 8/2005 | Orak | 463/9 |
| 7,169,051 | B1 * | 1/2007 | Mossbarger | 463/42 |
| 7,785,180 | B1 * | 8/2010 | von Ahn et al. | 463/9 |
| 7,980,931 | B1 * | 7/2011 | Krane | A63F 13/12 434/236 |
| 8,900,043 | B1 * | 12/2014 | Elias et al. | 463/10 |
| 2004/0242327 | A1 * | 12/2004 | Shahar | A63F 13/12 463/42 |

(Continued)

*Primary Examiner* — Seng H Lim

(57) ABSTRACT

A method includes displaying an obscured first image to a first user, where the first image is associated with a first alpha-numeric string. The method also includes generating a score based on an amount of the first image revealed or not revealed and whether the first user is able to successfully identify the first alpha-numeric string. The method may further include revealing at least a portion of the first image to the first user and receiving user input defining at least the portion of the first image revealed to the first user. The user input could include one or more swipes across a touchscreen that displays the obscured first image.

21 Claims, 13 Drawing Sheets

(56) References Cited

U.S. PATENT DOCUMENTS

| | | | |
|---|---|---|---|
| 2005/0233809 A1* | 10/2005 | Walmsley | A63F 9/183 463/37 |
| 2008/0207318 A1* | 8/2008 | Bailey et al. | 463/31 |
| 2009/0325661 A1* | 12/2009 | Gross | 463/9 |
| 2012/0064957 A1* | 3/2012 | Suteerawanit | A63F 13/10 463/9 |
| 2012/0071220 A1* | 3/2012 | Hoyt et al. | 463/9 |
| 2013/0079077 A1* | 3/2013 | Stegall | A63F 13/10 463/9 |
| 2013/0079079 A1* | 3/2013 | Bouchard et al. | 463/9 |
| 2013/0084976 A1* | 4/2013 | Kumaran | G06F 17/2845 463/30 |
| 2014/0128137 A1* | 5/2014 | Balise, III | A63F 13/005 463/10 |

\* cited by examiner

GAME FOR PORTABLE DEVICES OR OTHER GAMING DEVICES

CROSS-REFERENCE TO RELATED APPLICATION AND PRIORITY CLAIM

This application claims priority under 35 U.S.C. §119(e) to U.S. Provisional Patent Application No. 61/659,775 filed on Jun. 14, 2012, which is hereby incorporated by reference in its entirety.

TECHNICAL FIELD

This disclosure relates generally to entertainment devices. More specifically, this disclosure relates to a game for portable devices or other gaming devices.

BACKGROUND

Portable devices such as mobile smartphones and tablet computers are extremely popular, as are home gaming systems. The markets for these devices continue to grow. Many portable devices include touchscreen displays that allow users to perform various functions by physically touching the screens of the devices. As particular examples, users can touch the displays of these devices to view and compose email messages, browse the Internet, and play games. Many home gaming systems include wired or wireless control devices, and these systems display games and other content on televisions and other display devices.

SUMMARY

This disclosure provides a game for portable devices or other gaming devices.

In a first embodiment, a method includes displaying an obscured first image to a first user, where the first image is associated with a first alpha-numeric string. The method also includes generating a score based on an amount of the first image revealed or not revealed and whether the first user is able to successfully identify the first alpha-numeric string.

In a second embodiment, an apparatus includes a display configured to present an obscured first image to a first user, where the first image is associated with a first alpha-numeric string. The apparatus also includes a processing unit configured to generate a score based on an amount of the first image revealed or not revealed and whether the first user is able to successfully identify the first alpha-numeric string.

In a third embodiment, a non-transitory computer readable medium embodies a computer program. The computer program includes computer readable program code for displaying an obscured first image to a first user, where the first image is associated with a first alpha-numeric string. The computer program also includes computer readable program code fo generating a score based on an amount of the first image revealed or not revealed and whether the first user is able to successfully identify the first alpha-numeric string.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 3O, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
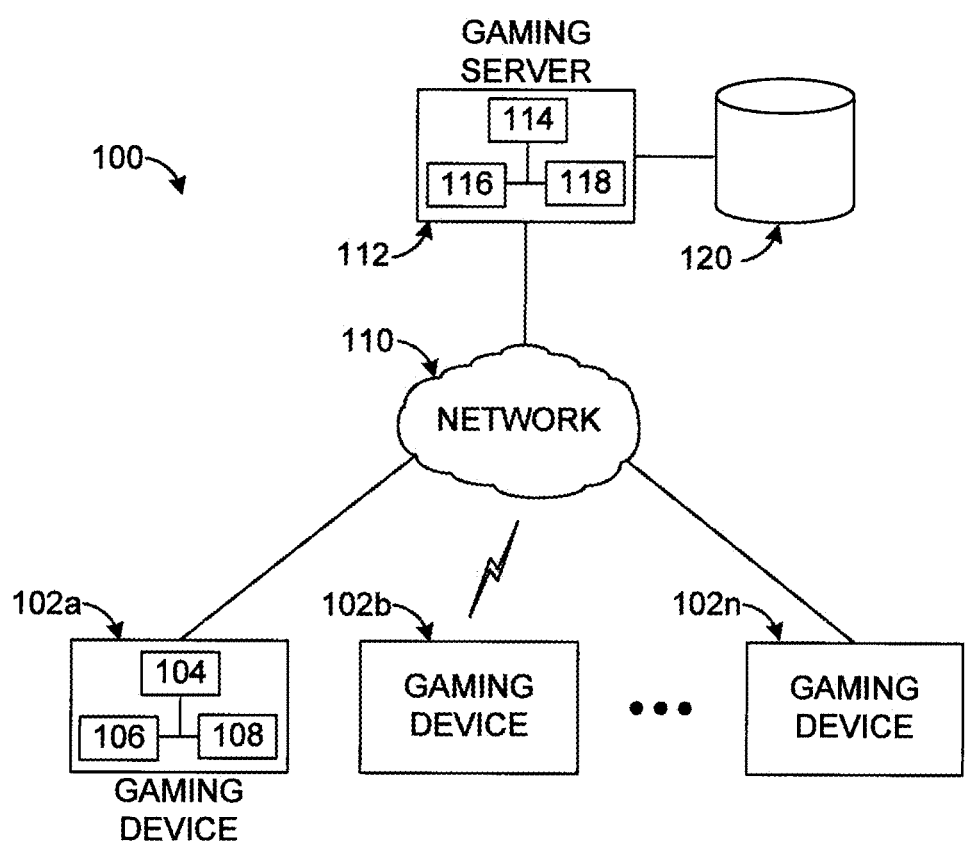
FIG. 1 illustrates an example system supporting gameplay between users in accordance with this disclosure.

FIG. 1 illustrates an example system 100 supporting gameplay between users in accordance with this disclosure. As shown in FIG. 1, the system 100 includes multiple gaming devices 102a-102n. The gaming devices 102a-102n generally represent computing devices or other devices that support gameplay by multiple users in one or more locations. A description of a particular game supported by the gaming devices 102a-102n is provided below.

Each gaming device 102a-102n represents any suitable device configured to support gameplay. In this example, each gaming device 102a-102n includes at least one processing unit 104, such as a microprocessor, microcontroller, digital signal processor, application specific integrated circuit, field programmable gate array, or other computing or processing device. At least one memory 106 stores instructions and data used, generated, or collected by the processing unit(s) 104, such as a volatile and/or non-volatile storage and retrieval device(s). Among other things, the memory 106 could store one or more applications supporting gameplay. At least one network interface 108 supports communication with external devices or systems over one or more wired or wireless links. The network interface(s) 108 could include at least one Ethernet or other wired interface(s), WiFi or other wireless interface(s), or other interface(s). The gaming devices 102a-102n could include portable devices such as mobile smartphones and tablet computers. As particular examples, the gaming devices 102a-102n can include APPLE IPHONE, APPLE IPAD, APPLE IPOD, GOOGLE ANDROID, and other devices. The gaming devices 102a-102n could also include home gaming systems, such as MICROSOFT XBOX, SONY PLAYSTATION, or NINTENDO WII gaming systems.

At least one network 110 facilitates communication between various components, such as between the gaming devices 102a-102n, in the system 100. For example, the network 110 may transport Internet Protocol (IP) packets, frame relay frames, Asynchronous Transfer Mode (ATM) cells, or other suitable information between network addresses. The network 110 may include one or more local area networks, metropolitan area networks, wide area networks, all or a portion of a global network, or any other communication system(s) at one or more locations. As a particular example, the network 110 could represent the Internet. Note that multiple networks 110 could also be used, such as when each gaming device 102a-102n couples to the Internet via a local area network.

A gaming server 112 supports various functions related to gameplay by the gaming devices 102a-102n. For example, as described below, the gaming server 112 can be used to support gameplay among multiple gaming devices 102a-

102n, which could be local to or remote from one another. Among other things, the gaming server 112 can facilitate interaction between gaming devices 102a-102n, allowing users to compete against one another.

The gaming server 112 represents any suitable device configured to support gameplay between multiple end user devices. In this example, the gaming server 112 includes at least one processing unit 114, such as a microprocessor, microcontroller, digital signal processor, application specific integrated circuit, field programmable gate array, or other computing or processing device. At least one memory 116 stores instructions and data used, generated, or collected by the processing unit(s) 114, such as a volatile and/or non-volatile storage and retrieval device(s). Among other things, the memory 116 could store one or more applications supporting gameplay among multiple end user devices. At least one network interface 118 supports communication with external devices or systems over one or more wired or wireless links. The network interface(s) 118 could include at least one Ethernet or other wired interface(s), WiFi or other wireless interface(s), or other interface(s).

At least one database 120 can be used to more persistently store information used by the gaming server 112 to support gameplay by the gaming devices 102a-102n. For example, the database 120 could store usernames and passwords of users of the gaming devices 102a-102n, an identification of current or prior games between the gaming devices 102a-102n, and a status of current games between the gaming devices 102a-102n. The database 120 includes any suitable structure for storing and facilitating retrieval of information.

Although FIG. 1 illustrates one example of a system 100 supporting gameplay between users, various changes may be made to FIG. 1. For example, the game described below can be implemented in any other suitable system involving any number of gaming devices.

FIGS. 2A through 2G illustrate an example implementation of a game between users in accordance with this disclosure. In particular, FIGS. 2A through 2G illustrate an example method 200 describing the game. During the description of the method 200, reference is made to FIGS. 3A through 3O, which illustrate example screenshots of the game between users in accordance with this disclosure. In the following description, the users are described as including a local user who is playing against one or more remote users. However, this does not impose any geographical requirements on the users, as a remote user could be around the world from the local user, next door to the local user, or in any other location.

In general, the game described below allows a first user to capture an image, such as with a camera on a gaming device or a separate camera. The first user or the game application can also identify an alpha-numeric string, such as text, identifying an object in the image or otherwise associated with the image. For example, the first user can capture an image of a laptop computer and provide the text "LAPTOP." An obscured version of the image and a scrambled set of alpha-numeric characters are provided to a second user. The second user can use his or her gaming device to reveal one or more portions of the image, and the second user attempts to guess what the alpha-numeric string is based on the revealed image. The second user can earn points based on, for example, the amount of the image that is revealed. Once the second user's turn ends, the process can repeat with the second user sending an obscured image to the first user.

Figure 2A:
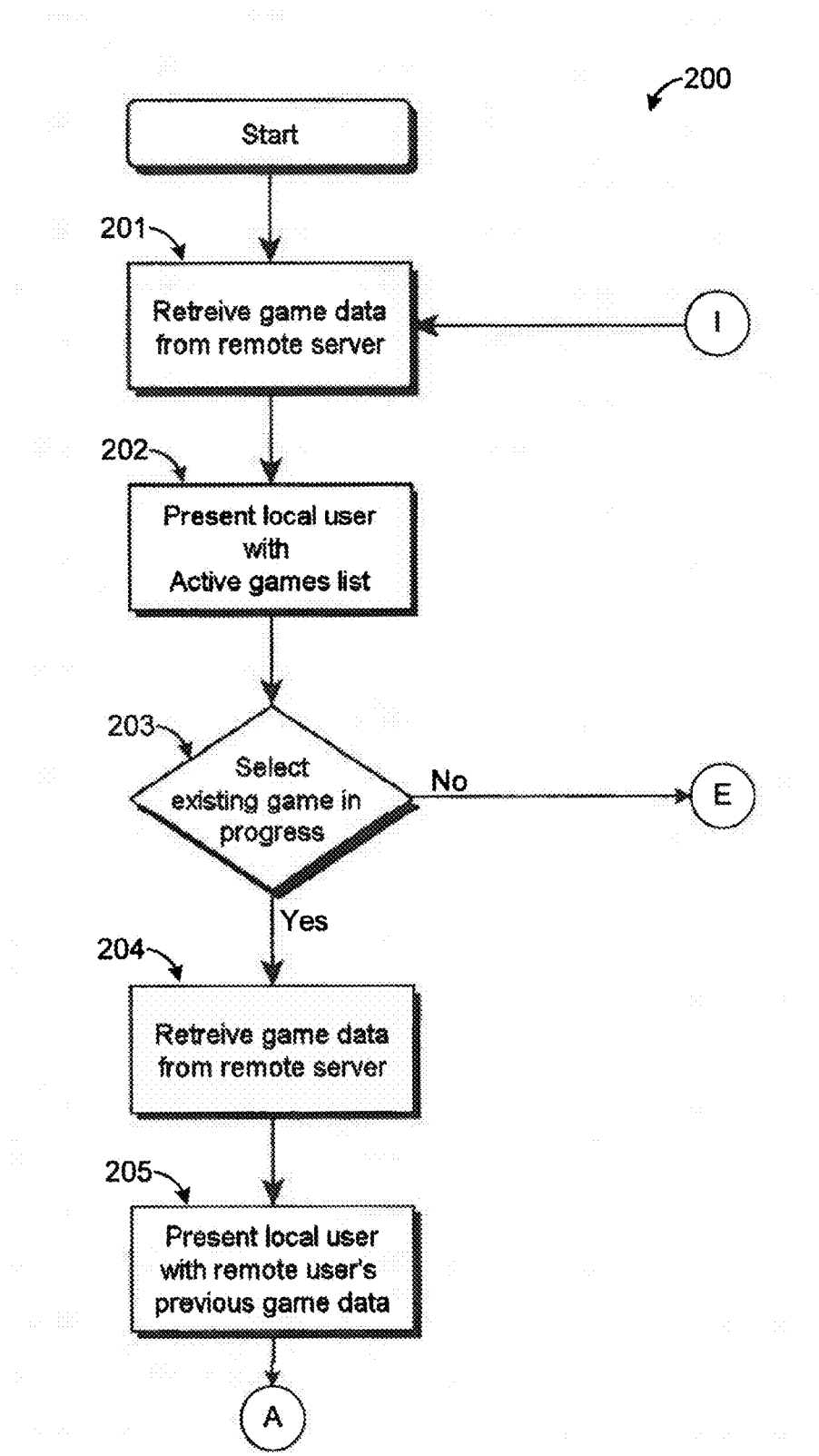
FIGS. 2A through 2G illustrate an example implementation of a game between users in accordance with this disclosure.
Figure 2B:
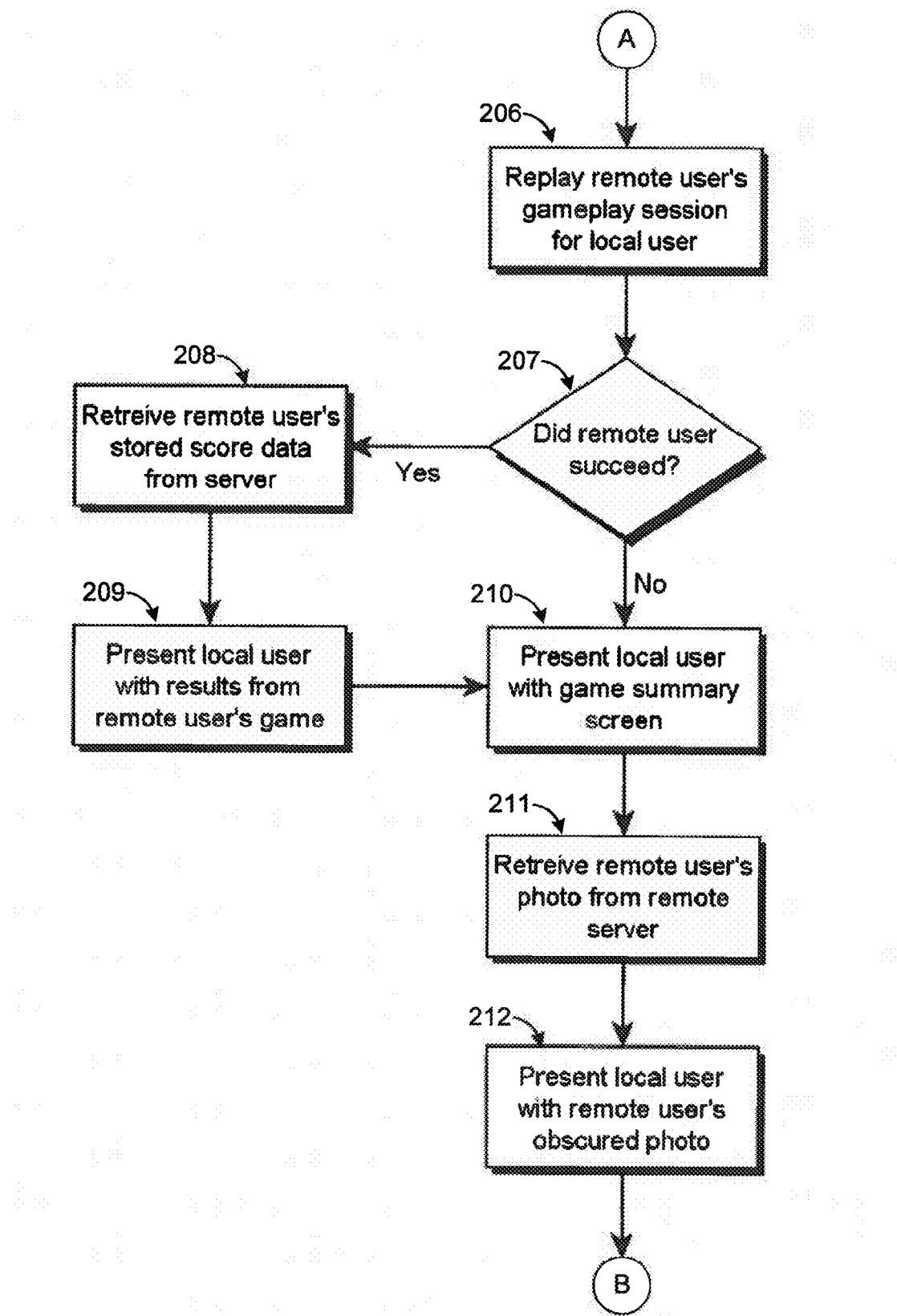
Figure 2C:
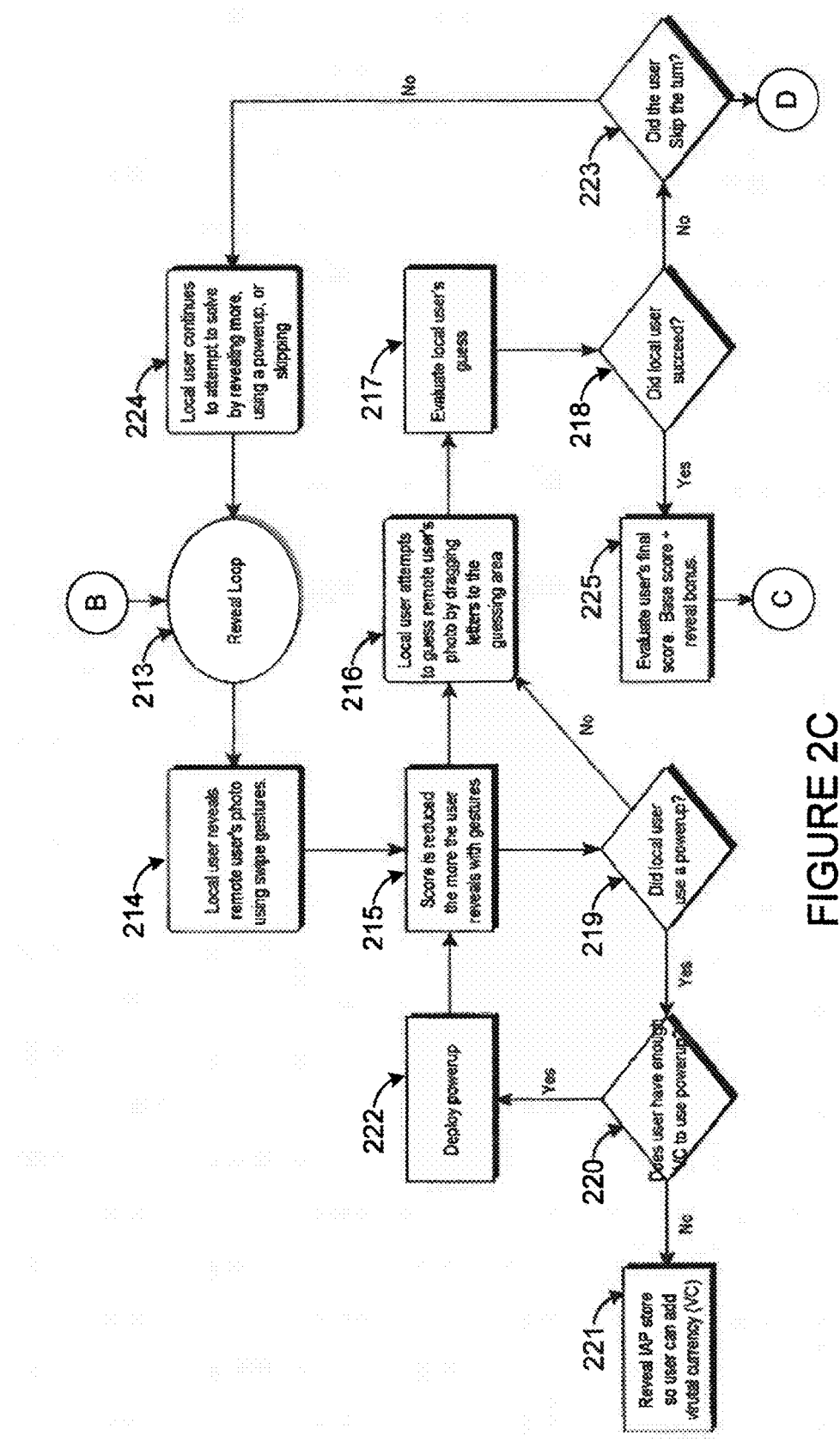
Figure 2D:
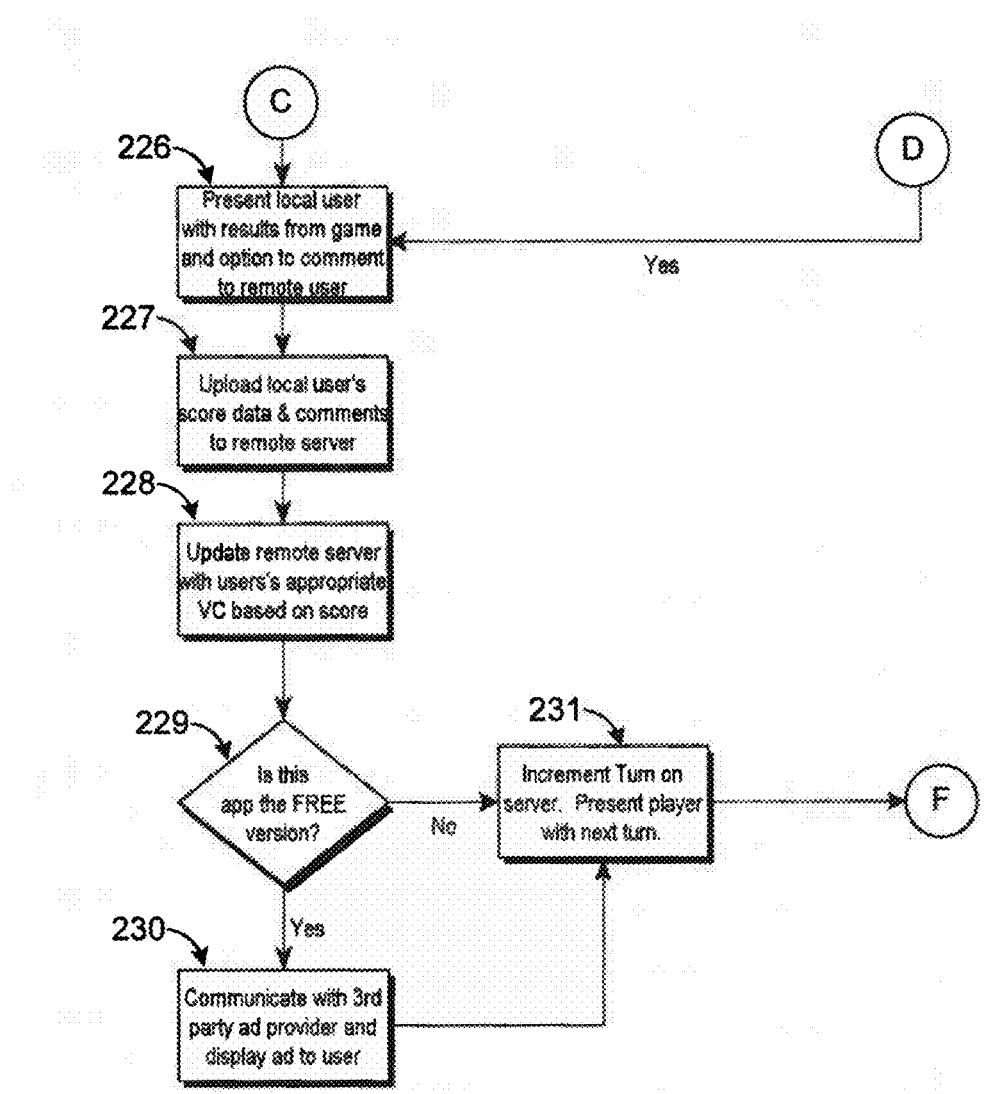
Figure 2E:
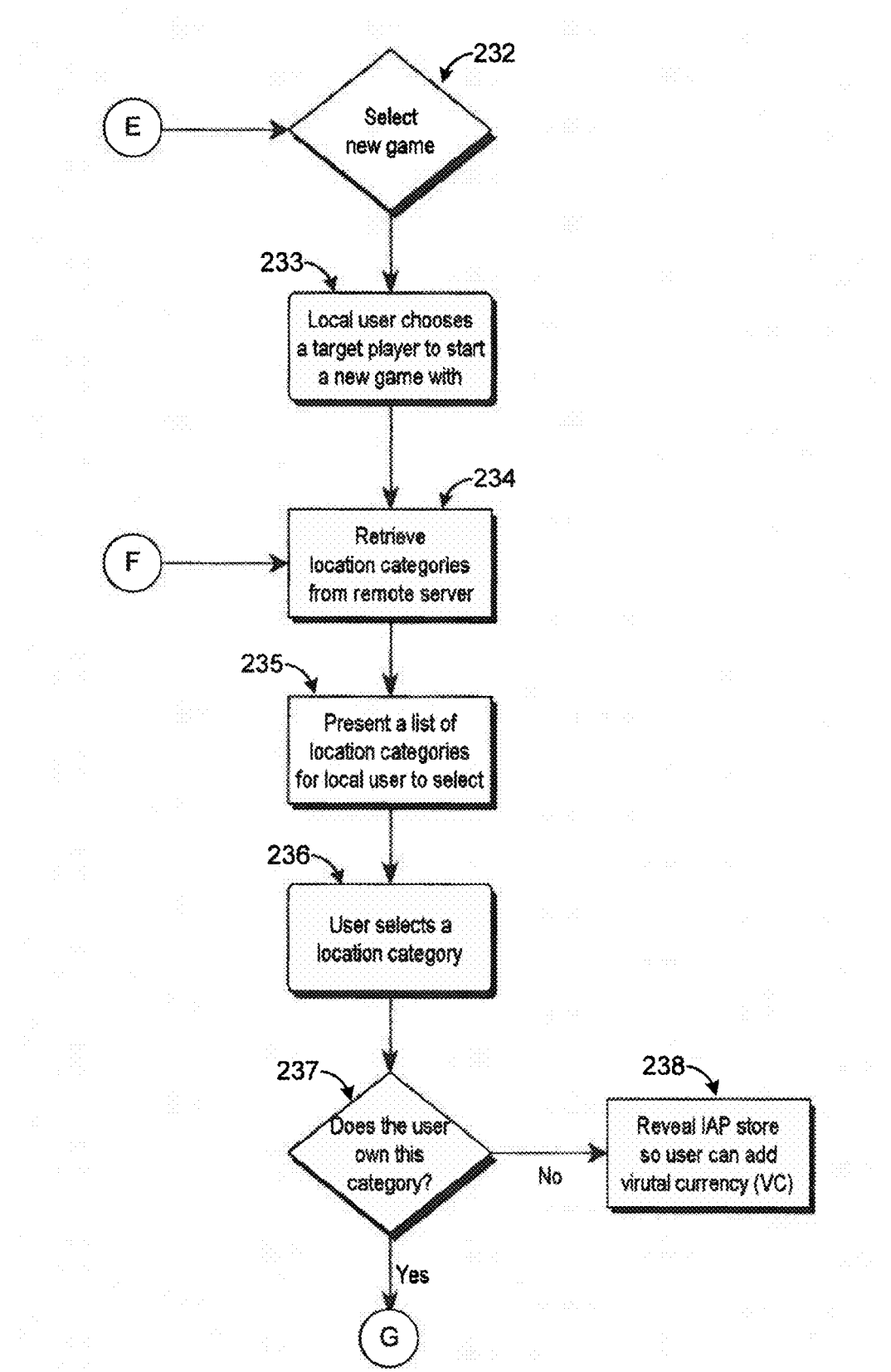
Figure 2F:
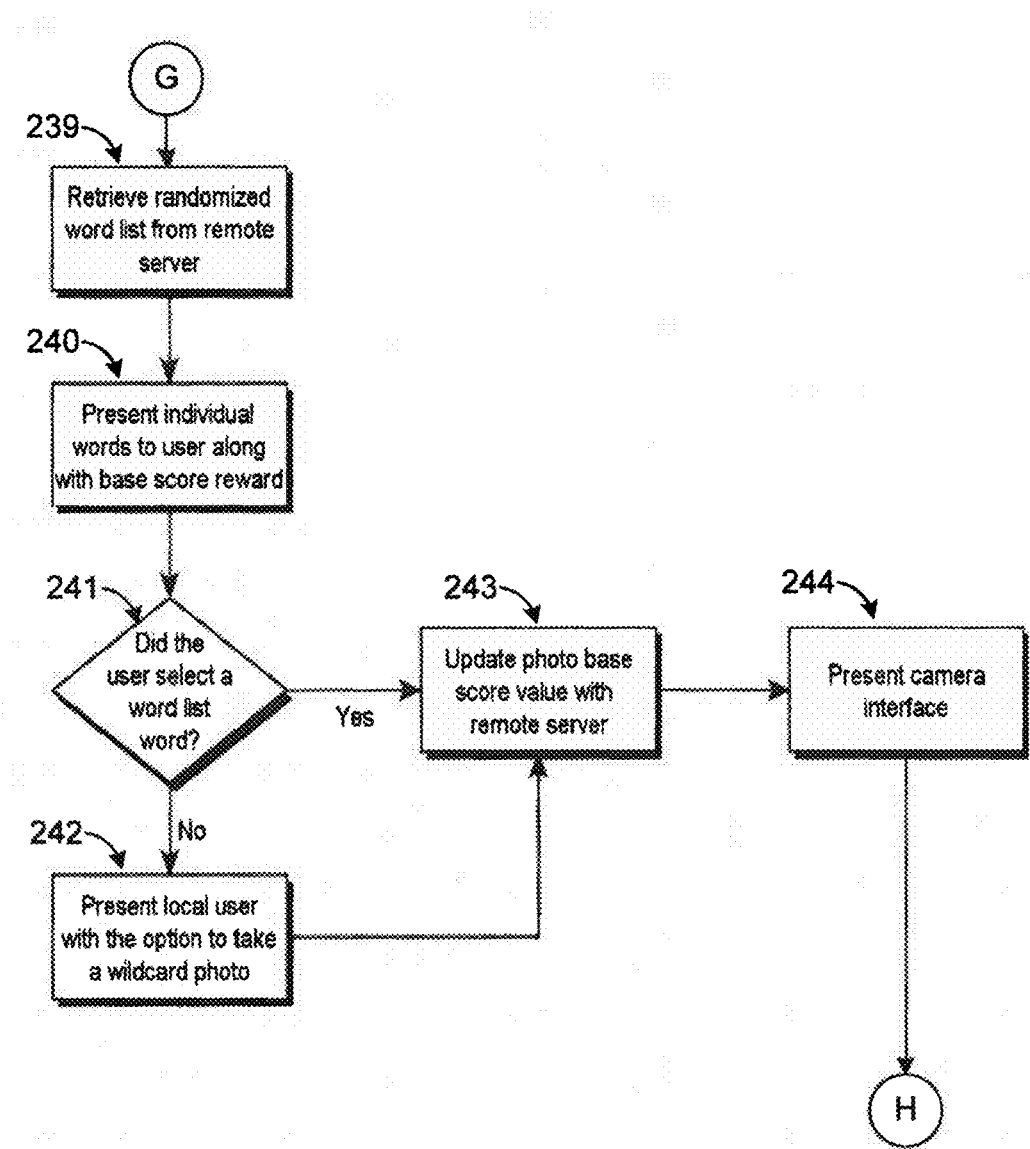
Figure 2G:
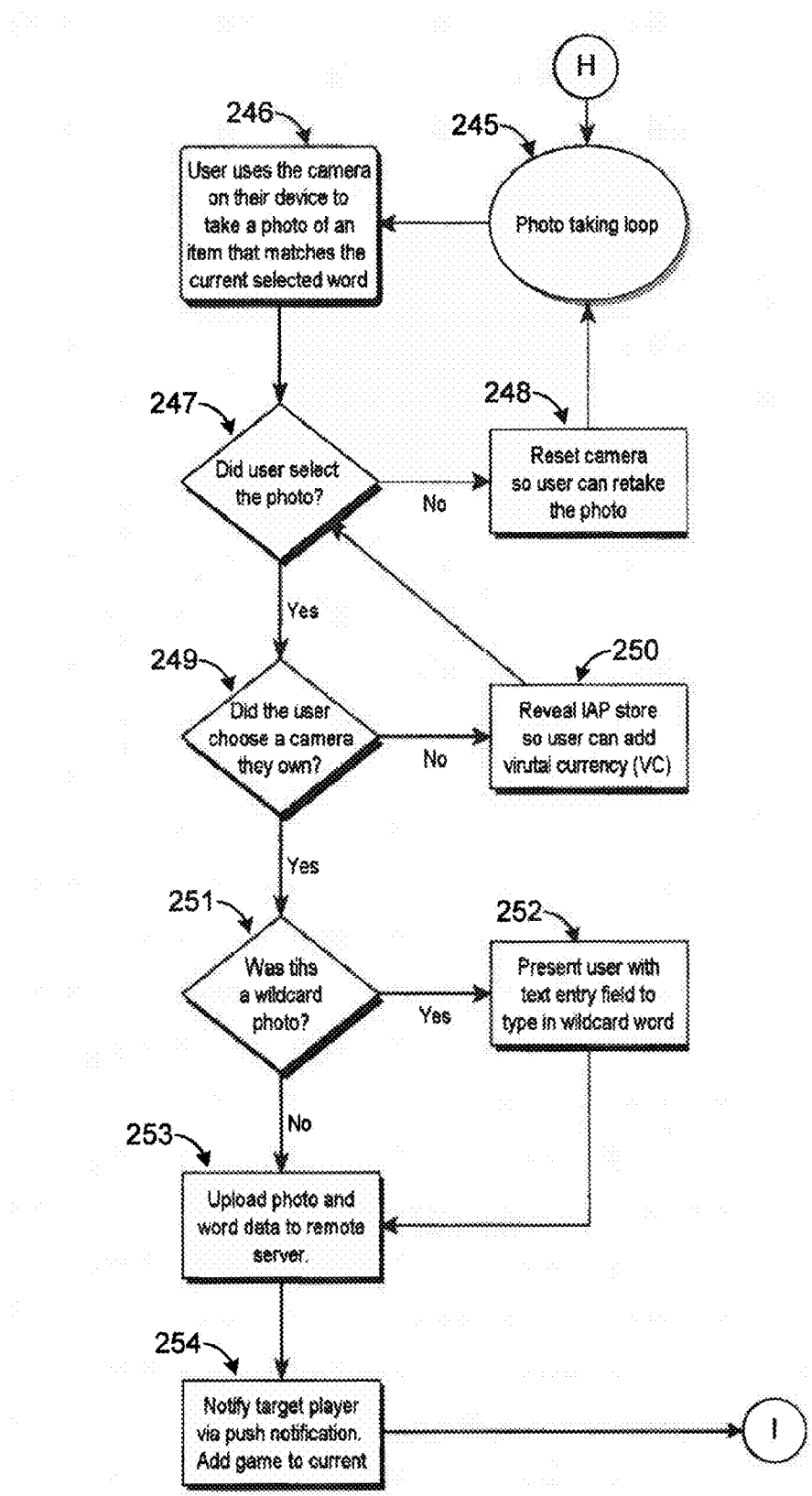

As shown in FIG. 2A, the method 200 begins when a local user starts an application, such as by invoking execution of a game application on a portable device or home gaming system. While loading the application, the application retrieves game data from a remote server at step 201. This could include, for example, the local user's gaming device 102a-102n retrieving game data from the gaming server 112 in the background. The data can include summary game data specific to the local user.

Figure 3A:
FIGS. 3A through 3O illustrate example screenshots of a game between users in accordance with this disclosure.

If the local user has any active game(s) in progress with remote user(s), the application presents a list of the game(s) in an "Active Games List" at step 202. This could include, for example, the local user's gaming device presenting a list of active games, including each remote user's username, the round/turn in the game, and relevant game status information. An example of this is shown in FIG. 3A, where a screenshot 302 identifies three active games, the remote user involved in each game, the round of each game, and the status of each game.

The local user is presented with the option of continuing an existing game or starting a new game. If the local user elects to continue an existing game at step 203 (such as by selecting one of the games in the "Active Games List"), the application retrieves detailed game data for the selected existing game at step 204. This could include, for example, the local user's gaming device communicating with the gaming server 112 to retrieve data associated with the selected game.

Figure 3C:
Figure 3B:
Figure 3B:

The retrieved data is processed and presented to the local user at step 205. As part of this, the application presents the local user with a replay of the remote user's gameplay session during his or her prior turn at step 206. An example of this is shown in FIG. 3B, where two screenshots 304-306 illustrate how the remote user revealed a portion of an image of an object (a laptop computer) and then successfully guessed the string associated with the image (the word "LAPTOP"). If the application determines that the remote user was successful in completing the prior round/turn at step 207, the application retrieves the remote user's score at step 208 and presents it to the local user at step 209. An example of this is shown in FIG. 3C, where a screenshot 308 indicates that the remote user was successful and identifies the number of points earned by the remote user. The application can present a summary screen of the game's status at step 210, such as by identifying the total numbers of points earned by the local and remote users during the course of the selected game.

Figure 3D:
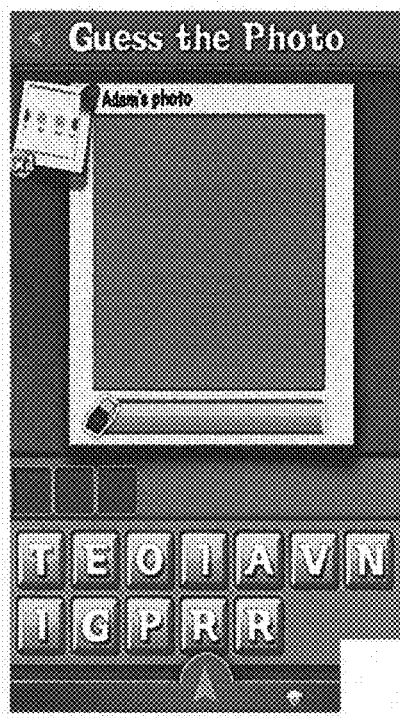

At this point, it is the local user's turn to play, and the application communicates with the remote server and retrieves the remote user's newest image and string at step 211. This could include, for example, the local user's gaming device communicating with the gaming server 112 to obtain a photograph or other image provided by the remote user's gaming device. An obscured version of the remote user's image is presented to the local user at step 212. This could include, for example, the local user's gaming device presenting a grayed-out or other form of the remote user's image, where most or all of the remote user's image is obscured. This could also include the local user's gaming device presenting a set of randomized character tiles and a guessing area identifying the number of characters in the string to be guessed by the local user. An example of this is shown in FIG. 3D, where a screenshot 310 includes an obscured image, a set of randomized tiles, and a guessing area with three blanks into which three tiles can be placed.

Figure 3E:

The application then enters a "reveal loop" at step 213. During this time, the local user can reveal at least part of the obscured image at step 214. This could be done in any suitable manner, such as by the local user "swiping" his or her finger(s) or object(s) (such as a stylus) across the touchscreen display of a portable device to reveal one or more portions of the obscured image. This could also be done by the local user using a wired or wireless controller to reveal portions of the image on a home gaming system. Any other suitable mechanism could be used, such as by revealing one or more predefined sections of an image based on user input or one or more predefined sections selected by a gaming device or server. The local user here is attempting to reveal enough information about the image to guess the string associated with the image. An example of this is shown in FIG. 3E, where a screenshot 312 includes the image from the remote user but only parts of the image remain obscured.

As the local user reveals more of the obscured image, the possible score that the local user could earn is reduced at step 215. This could include, for example, reducing a "swipe meter" as more of the obscured image is revealed until the swipe meter reaches zero, at which point the local user can no longer use swipes to reveal any more of the image. Additionally, as the local user is revealing the image and depleting the swipe meter, a bonus score can also be reduced to match the percentage of the swipe meter that is left. The bonus score can be reduced to zero if the local user drains the swipe meter to zero. The amount of the image that the local user is allowed to reveal can be dynamically driven, such as by one or more variables that the application downloads from the remote server at runtime.

At any time during the local user's turn, the local user can attempt to guess the string at step 216. This could include, for example, the local user dragging certain character tiles into the guessing area. The number of tiles could be limited to a maximum value, such as twelve. Also, the number of blanks in the guessing area could be limited to a maximum value, such as nine. Each guess by the local user is evaluated at step 217, and a determination is made whether the local user successfully guesses the string at step 218.

If the local user is having difficulty guessing the string, he or she can deploy a "power-up" that provides more information for the local user to attempt to solve the string. A determination is made whether the local user wishes to use a power-up at step 219. For example, the power-up request could be initiated when the local user selects a power-up button. If the request is made, the application determines whether the local user is allowed to use a power-up at step 220. This could include, for example, the application communicating with the remote server, verifying that the local user's virtual currency counts are accurate, and determining whether the local user has enough virtual currency to invoke the power-up. The power-up request can be denied, for example, due to a server/client virtual currency mismatch or because the local user does not have enough virtual currency.

If the local user does not have enough virtual currency, the application presents the local user with a store panel where he or she can choose to purchase more virtual currency at step 221. This could be done, for example, using an "In App" purchase mechanism. The virtual price of a power-up and the "In App" purchase price that the application presents to the local user can be dynamically driven, such as by one or more variables that the application downloads from the remote server at runtime. If the local user deploys a power-up at step 222, various actions could be taken, such as revealing a portion of the string or a larger portion of the remote user's image.

If the local user's guess at step 218 is incorrect, a determination is made whether the local user has given up and skipped his or her turn at step 223. If not, the local user continues attempting to complete the round, such as by revealing more of the obscured image, using a power-up, or skipping his or her turn at step 224. If the local user successfully guesses the string at step 218, the application determines the local user's final score for this round at step 225. This could include, for example, the local user's gaming device summing the local user's base score plus any bonus.

Figure 3F:
Figure 3G:
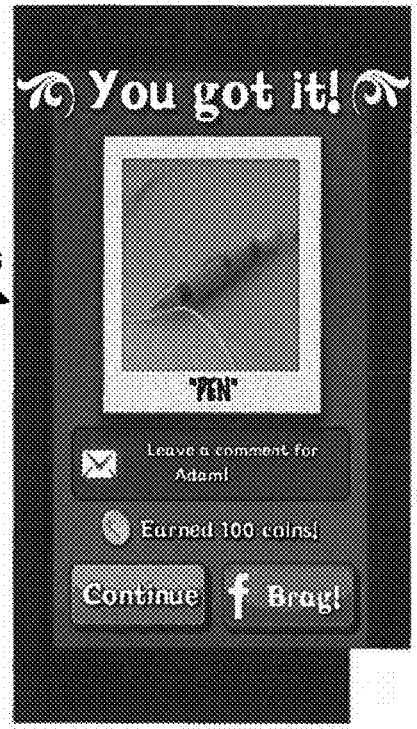

The local user is presented with a game summary and various options at step 226. This could include, for example, the local user's gaming device displaying the number of points earned by the local user in the current round, along with a comment from the remote user. An example of this is shown in FIG. 3F, where a screenshot 314 includes the complete unobscured image from the remote user, the string guessed by the local user, a comment from the remote user, and buttons for continuing the game or posting information to a social media site (such as FACEBOOK). The local user is also given an opportunity to send a comment back to the remote user. An example of this is shown in FIG. 3G, where a screenshot 316 includes the complete unobscured image from the remote user, the string guessed by the local user, an option for sending a comment to the remote user, and buttons for continuing the game or posting information to a social media site.

The local user's score and any comments are uploaded to the remote server at step 227, and the local user's "virtual currency" count is updated at step 228. In this example, the score earned by the local user represents virtual currency, which can be used as described above to purchase power-ups or other virtual items during the game. Note that the score earned by the local user can be based on various factors. For example, the application can tally the local user's score as a function of a base difficulty score for the string and a bonus related to how much of the "swipe meter" remains. The "swipe meter" could be based on, for example, the number of pixels or the percentage of the image revealed. This information can be calculated and provided to the remote server, which can then present the information to the remote user during the remote user's replay (step 206 on the remote user's gaming device). Any comments from the local user can also be presented to the remote user during the remote user's replay.

In some embodiments, the application executed by the local user's gaming device may be a free application or a paid application. If a determination is made that the local user is using the free version of the application at step 229, at least one advertisement is presented to the local user at step 230. This could include, for example, the local user's gaming device communicating with a third-party server to obtain an advertisement for presentation. The advertisement could be presented at any suitable time, such as once the local user navigates away from the "Results" presentation. The local user can choose to interact with that advertisement or skip it. The remote server increments whose turn it is in the game at step 231. The application proceeds to a new game or to the next round in the round/turn progression of the current game.

Figure 3H:
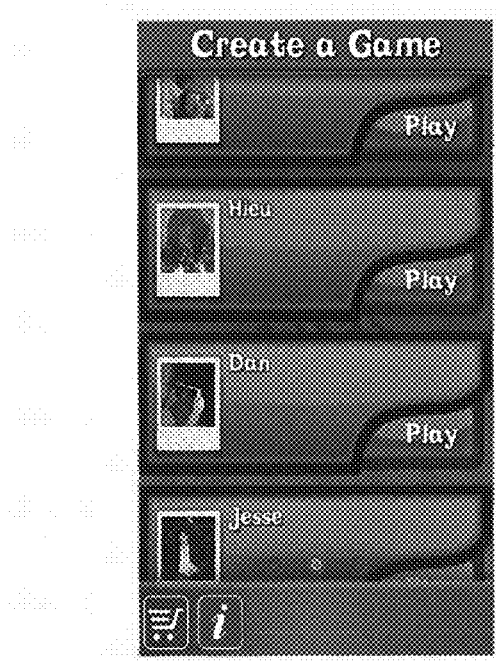

If the local user did not elect to continue an existing game at step 203 and instead elects to start a new game at step 232, the local user's gaming device communicates with the remote server and pulls a list of target remote users, which is presented to the local user. The local user selects a desired remote user or a random remote user to start a new game at step 233. An example of this is shown in FIG. 3H, where a screenshot 318 illustrates a list of potential remote users with whom the local user can initiate a new game.

Figure 3I:

The local user then obtains an image to be sent to the selected remote user. Note that this could occur in response to the initiation of a new game or the continuation of an existing game. In this example, the local user's gaming device communicates with the remote server and retrieves a list of location categories at step 234, which is presented to the local user at step 235. The retrieval can be done in the background. An example of this is shown in FIG. 3I, where a screenshot 320 identifies different locations where the local user may be located. Note that the local user's location could be identified in other ways, such as by using GPS coordinates. The local user's location is used to help identify possible images that the local user may be able to capture.

The local user selects a location category at step 236, and the application communicates with the remote server and determines whether the local user is allowed to select that category at step 237. If not, the local user is given the option of purchasing access to that category using virtual currency at step 238.

Figure 3J:
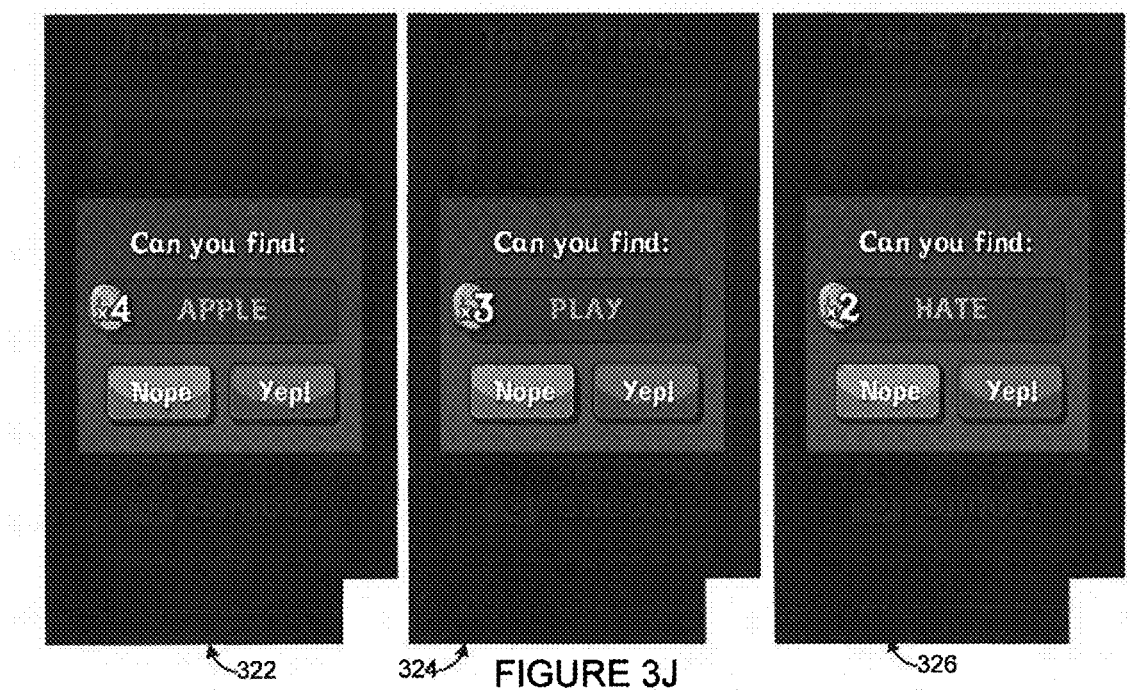

If the local user is authorized to use the selected location category, the application retrieves a randomized string list at step 239. This could include, for example, retrieving a list of three words randomly selected from a database. Each word can be associated with a score value based on an implied difficulty. The words and associated base scores are presented to the local user at step 240, and a determination is made whether the local user selects one of the presented words at step 241. An example of this is shown in FIG. 3J, where three screenshots 322-326 illustrate prompts asking whether the local user is able to obtain images of different words.

Figure 3K:

If no selection is made, the local user is given the option of using a "wildcard" image, which allows the local user to enter his or her own string and capture a suitable image, at step 242. An example of this is shown in FIG. 3K, where a screenshot 328 illustrates a prompt asking whether the local user wishes to select a wildcard. Regardless of whether the local user elects to choose a preselected string or enter his/her own string, the base score of the local user's selected string is updated at step 243.

Figure 3L:
Figure 3M:
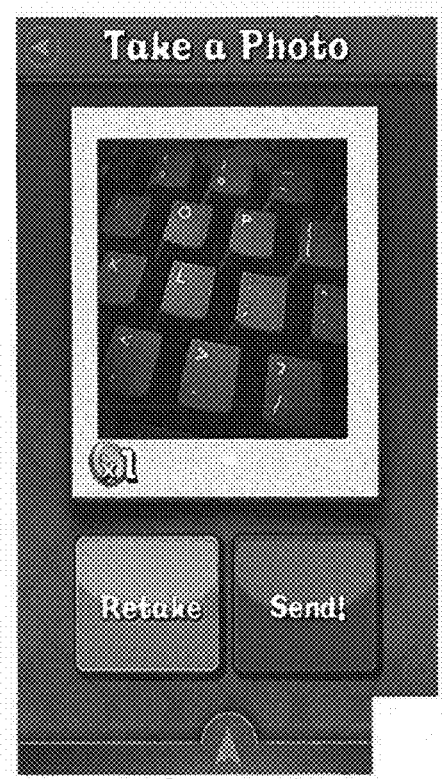

A camera interface is presented to the local user at step 244, and a "photo taking loop" is initiated at step 245. During this time, the local user moves around his or her environment and captures a photograph that matches the selected string at step 246. An example of this is shown in FIG. 3L, where a screenshot 330 shows a camera interface containing the current image that can be captured by the camera and an option to trigger the camera. A determination is made whether the local user has captured an image and decided to keep the captured image at step 247. An example of this is shown in FIG. 3M, where a screenshot 332 contains buttons allowing the local user to either retake the image or send the image to the remote server. If the local user wishes to retake the image, the camera is reset so the local user can capture another image at step 248.

The application on the local user's gaming device may allow the local user to choose different camera filters and overlays that augment the photograph that is taken. A determination is made whether the local user selects a camera filter that he or she owns at step 249. This could include, for example, the local user's gaming device communicating with the remote server to verify that the local user owns the selected filter. If not, the local user is given the option of purchasing the filter at step 250. For example, the local user's gaming device can confirm that the local user's virtual currency counts are accurate, grant the local user the ability to use the filter if adequate virtual currency is available to purchase the filter, or deny the local user due to a server/client virtual currency mismatch or due to inadequate virtual currency. If the local user does not have enough virtual currency, the application can present the local user with a store panel where he or she can choose to purchase more virtual currency, such as by using an "In App" purchase mechanism. The virtual currency prices of camera filters and the "In App" purchase prices that the application presents to the local user can be dynamically driven, such as by one or more variables that the application downloads from the remote server at runtime.

Figure 3N:

Once the local user elects to send the photograph (either the original or modified photograph), a determination is made whether this was a wildcard photograph at step 251. If so, the application presents the user with the ability to type his or her string into a text box at step 252. An example of this is shown in FIG. 3N, where a screenshot 334 shows that the local user has entered a string describing the image captured by the local user.

Figure 3O:

Once the photograph and optional wildcard selection process are complete, the application uploads the image and optional wildcard string to the remote server at step 253. The remote server notifies the remote user that the remote user can participate in a new or existing game at step 254. The remote user can be notified in any suitable manner, such as via a push notification. A new game is also added to the remote user's list of current games, or the game data for an existing game in progress is updated. An example of the notification is shown in FIG. 3O, where a screenshot 336 illustrates a notification displayed on the remote user's gaming device (an APPLE IPOD, IPHONE, or IPAD device in this example). The local user is then routed back to the "Active Games" list at step 201.

Although FIGS. 2A through 2G illustrate one example of an implementation of a game between users, various changes may be made to FIGS. 2A through 2G. For example, any other suitable mechanism could be used to select active games, invoke new games between users, capture images, obtain strings, or otherwise interact with a user. As a particular example, a user could select a pre-existing image (such as one provided by the server 112) rather than capturing his or her own photograph. Also, any other suitable mechanism could be used to score a user's round in the game, and the user's score may or may not represent virtual currency. Further, any other suitable mechanism could be used to allow users to purchase items during game play. In addition, while generally shown as a series of steps, various steps in FIGS. 2A through 2G could overlap, occur in parallel, occur in a different order, or occur any number of times, and various steps could be omitted if the corresponding functionality is not desired.

Although FIGS. 3A through 3O illustrate examples of screenshots of a game between users, various changes may be made to FIGS. 3A through 3O. For example, these screenshots assume that the game is being played on an APPLE IPOD, IPHONE, or IPAD device. However, the same or similar screens could be implemented on other portable devices or displayed on televisions or other displays by a home gaming system. Also, the content and arrangement in the screenshots is for illustration only. Various other or additional contents could be displayed in the screens in any other suitable configuration.

Note that in the above description, it has been assumed that each round of the game involves two players, one user that provides an image and another user that reveals at least part of the image and guesses the string. However, other embodiments could also be used. For example, the game could represent a one-player game, where the single player receives obscured images from a computing device or other device and attempts to identify the associated string. As another example, the game could involve three or more players. For instance, a local user could provide the same image to multiple remote users. The multiple remote users may compete against each other, such as by competing to see who can guess the string while obtaining the highest score. Depending on the implementation, each remote user can earn virtual currency based on his or her own score, or only the remote user with the highest score may earn virtual currency (other configurations are also possible). The multiple remote users may also not compete against each other, such as when each remote user competes against the local user but not each other. When there are multiple remote users, each remote user could reveal his or her own portion of the obscured image, or the portion(s) of the obscured image revealed by one remote user could also be revealed to another remote user. This may be used, for example, when multiple remote users are competing as a team against the local user. In general, a wide variety of configurations involving any number of players are possible.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In the above description, reference is repeatedly made to at least one application on the users' gaming devices performing various functions. Note that one or more other applications executed on the gaming server 112 could support the above-described operations performed by the gaming server 112.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   displaying, on a touchscreen display, an obscured first image to a first user, the first image associated with a first alpha-numeric string, wherein the first image is provided by a device associated with a second user;
   revealing, on the touchscreen display, at least a portion of the first image to the first user in response to receiving an input on the touchscreen display by the first user, the input defining at least the portion of the first image;
   generating, by a processing unit, a score based on an amount of the first image revealed or not revealed and whether the first user is able to successfully identify the first alpha-numeric string, wherein the score is based on (i) a base score associated with a difficulty of identifying the first alpha-numeric string and (ii) a bonus score associated with the amount of the first image revealed or not revealed by the first user; and
   displaying the score or storing the score in a memory.

2. The method of claim 1, wherein the first alpha-numeric string is also provided by the device associated with the second user.

3. The method of claim 1, further comprising:
   sending information about the score to a social media site.

4. The method of claim 1, wherein the user input comprises one or more swipes across the touchscreen display that displays the obscured first image.

5. The method of claim 1, further comprising:
   obtaining a second image associated with a second alpha-numeric string; and
   communicating the second image for delivery to the second user.

6. The method of claim 5, wherein obtaining the second image comprises capturing the second image using a camera associated with the first user.

7. The method of claim 1, further comprising:
   transmitting the score to a remote server, wherein the score is used to update a virtual currency of the first user, the virtual currency being usable by the first user to purchase items associated with a game.

8. The method of claim 1, further comprising:
   presenting to the first user multiple alpha-numeric tiles and a guessing area having multiple empty blanks for receiving the tiles or a subset of the tiles; and
   receiving a second input from the first user, the second input defining one or more guesses of the first alpha-numeric string, each guess comprising an association of alpha-numeric tiles to blanks in the guessing area.

9. An apparatus comprising:
   a touchscreen display configured to:
     present an obscured first image to a first user, the first image associated with a first alpha-numeric string, wherein the first image is provided by a device associated with a second user; and
     reveal at least a portion of the first image to the first user in response to receiving an input on the touchscreen display by the first user, the input defining at least the portion of the first image; and a processing unit configured to:

generate a score based on an amount of the first image revealed or not revealed and whether the first user is able to successfully identify the first alpha-numeric string, wherein the score is based on (i) a base score associated with a difficulty of identifying the first alpha-numeric string and (ii) a bonus score associated with the amount of the first image revealed or not revealed by the first user; and cause the score to be displayed on the touchscreen display or stored in a memory.

10. The apparatus of claim 9, wherein the first alpha-numeric string is also provided by the device associated with the second user.

11. The apparatus of claim 9, wherein the processing unit is further configured to send information about the score to a social media site.

12. The apparatus of claim 9, wherein:

the user input comprises one or more swipes across the touchscreen display.

13. The apparatus of claim 9, wherein the apparatus further comprises an interface configured to communicate a second image associated with a second alpha-numeric string for delivery to the second user.

14. The apparatus of claim 13, wherein the apparatus comprises a camera configured to capture the second image.

15. The apparatus of claim 9, wherein the processing unit is further configured to transmit the score to a remote server, wherein the score is used to update a virtual currency of the first user, the virtual currency being usable by the first user to purchase items associated with a game.

16. The apparatus of claim 9, wherein:

the display is further configured to present to the first user multiple alpha-numeric tiles and a guessing area having multiple empty blanks for receiving the tiles or a subset of the tiles; and the processing unit is further configured to receive a second input from the first user, the second input defining one or more guesses of the first alpha-numeric string, each guess comprising an association of alpha-numeric tiles to blanks in the guessing area.

17. A non-transitory computer readable medium embodying a computer program, the computer program comprising computer readable program code for:

displaying, on a touchscreen display, an obscured first image to a first user, the first image associated with a first alpha-numeric string, wherein the first image is provided by a device associated with a second user;

revealing, on the touchscreen display, at least a portion of the first image to the first user in response to receiving an input on the touchscreen display by the first user, the input defining at least the portion of the first image;

generating a score based on an amount of the first image revealed or not revealed and whether the first user is able to successfully identify the first alpha-numeric string, wherein the score is based on (i) a base score associated with a difficulty of identifying the first alpha-numeric string and (ii) a bonus score associated with the amount of the first image revealed or not revealed by the first user; and displaying the score or storing the score in a memory.

18. The computer readable medium of claim 17, wherein the first alpha-numeric string is also provided by the device associated with the second user.

19. The computer readable medium of claim 17, wherein the computer program further comprises:

computer readable program code for sending information about the score to a social media site.

20. The computer readable medium of claim 17, wherein the computer program further comprises:

computer readable program code for obtaining a second image associated with a second alpha-numeric string; and computer readable program code for initiating communication of the second image for delivery to the second user.

21. The method of claim 1, further comprising:

determining that the first user requests to use a game hint;

determining an amount of virtual currency associated with the first user; and upon a determination that the amount of virtual currency equals or exceeds a predetermined threshold associated with the game hint, providing the game hint to the first user by revealing a portion of the first alpha-numeric string or a portion of the first image.

* * * * *